No. 790,589. PATENTED MAY 23, 1905.
H. PARKER & G. A. CUTTER.
PULP TREATING AND PAPER MAKING MACHINERY.
APPLICATION FILED FEB. 4, 1903.

7 SHEETS—SHEET 1.

No. 790,589. PATENTED MAY 23, 1905.
H. PARKER & G. A. CUTTER.
PULP TREATING AND PAPER MAKING MACHINERY.
APPLICATION FILED FEB. 4, 1903.

7 SHEETS—SHEET 4.

No. 790,589. PATENTED MAY 23, 1905.
H. PARKER & G. A. CUTTER.
PULP TREATING AND PAPER MAKING MACHINERY.
APPLICATION FILED FEB. 4, 1903.
7 SHEETS—SHEET 5.
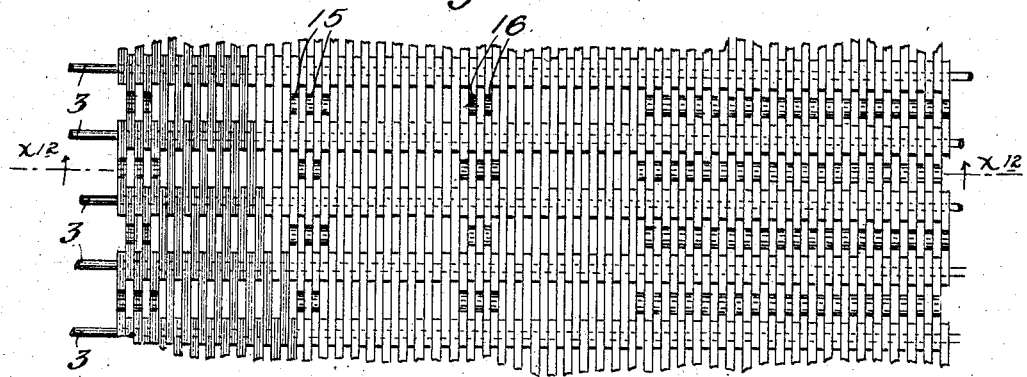
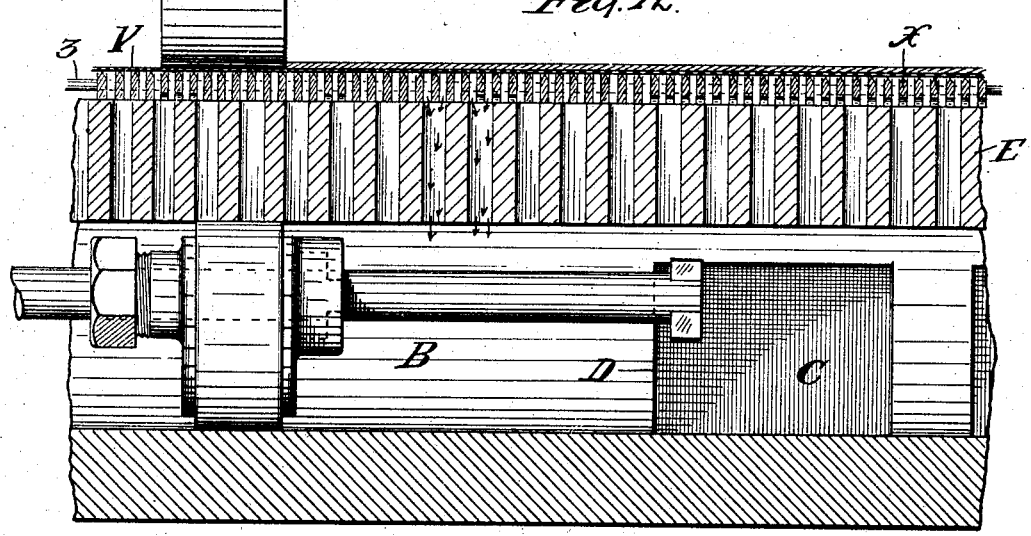
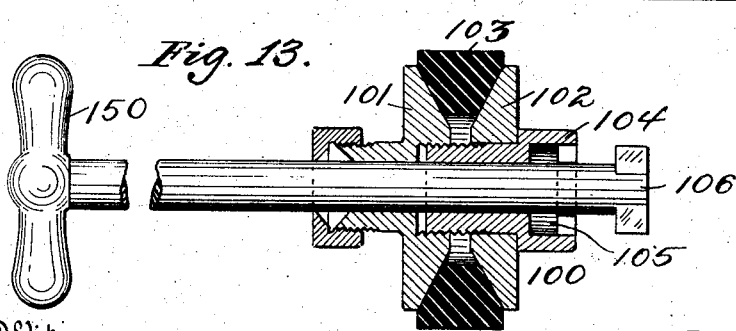

No. 790,589. PATENTED MAY 23, 1905.
H. PARKER & G. A. CUTTER.
PULP TREATING AND PAPER MAKING MACHINERY.
APPLICATION FILED FEB. 4, 1903.

7 SHEETS—SHEET 6.

Witnesses
C. F. Kilgore
H. Kreimendahl

Inventors
Harum Parker
George A. Cutter
by Simons & Vale
Attorneys

No. 790,589. PATENTED MAY 23, 1905.
H. PARKER & G. A. CUTTER.
PULP TREATING AND PAPER MAKING MACHINERY.
APPLICATION FILED FEB. 4, 1903.

7 SHEETS—SHEET 7.

Witnesses
Frank G. Campbell.
L. Kreimendahl.

Inventors
Howard Parker
George A. Cutter
by Simonds & Hull
Attorneys

No. 790,589.  
Patented May 23, 1905.

UNITED STATES PATENT OFFICE.

HOWARD PARKER AND GEORGE A. CUTTER, OF NASHUA, NEW HAMPSHIRE, ASSIGNORS TO IMPROVED PAPER MACHINERY COMPANY, OF CASTINE, MAINE, AND NASHUA, NEW HAMPSHIRE, A CORPORATION OF MAINE.

PULP-TREATING AND PAPER-MAKING MACHINERY.

SPECIFICATION forming part of Letters Patent No. 790,589, dated May 23, 1905.

Application filed February 4, 1903. Serial No. 141,830.

*To all whom it may concern:*

Be it known that we, HOWARD PARKER and GEORGE A. CUTTER, citizens of the United States of America, residing at Nashua, in the county of Hillsboro and State of New Hampshire, have invented certain new and useful Improvements in Pulp-Treating and Paper-Making Machinery, of which the following is a specification.

Figure 1:
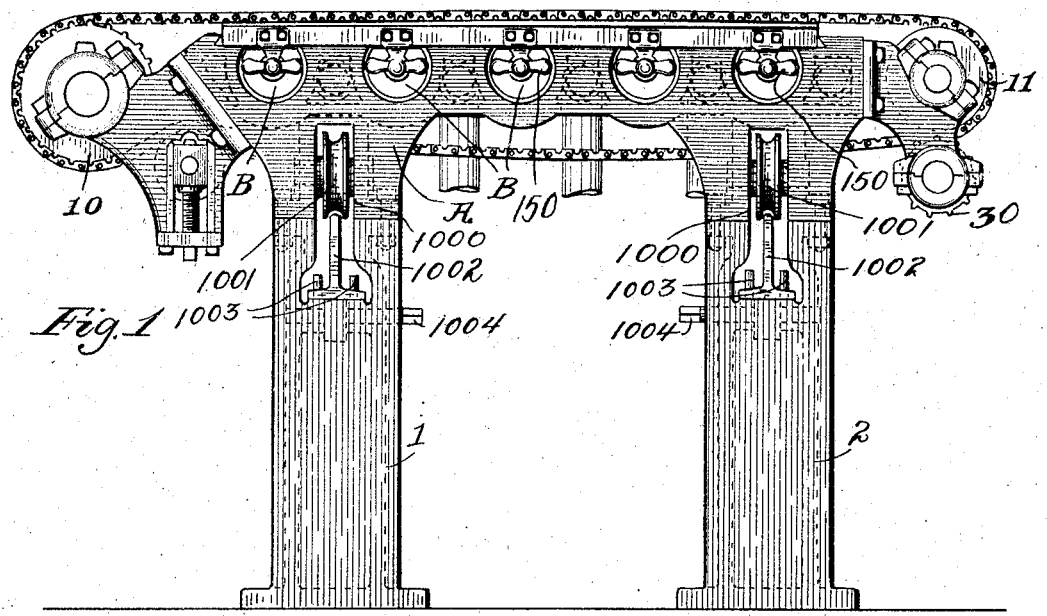
Figure 2:
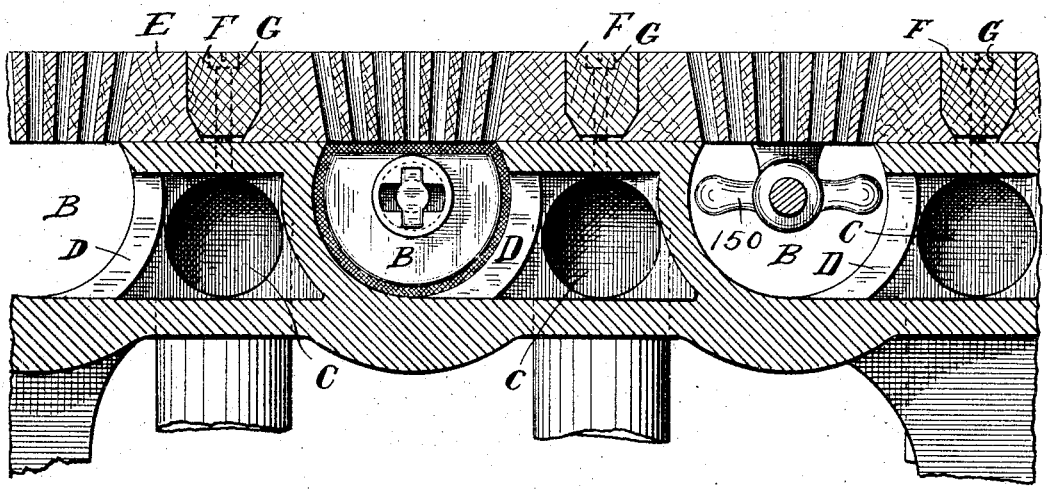
Figure 3:
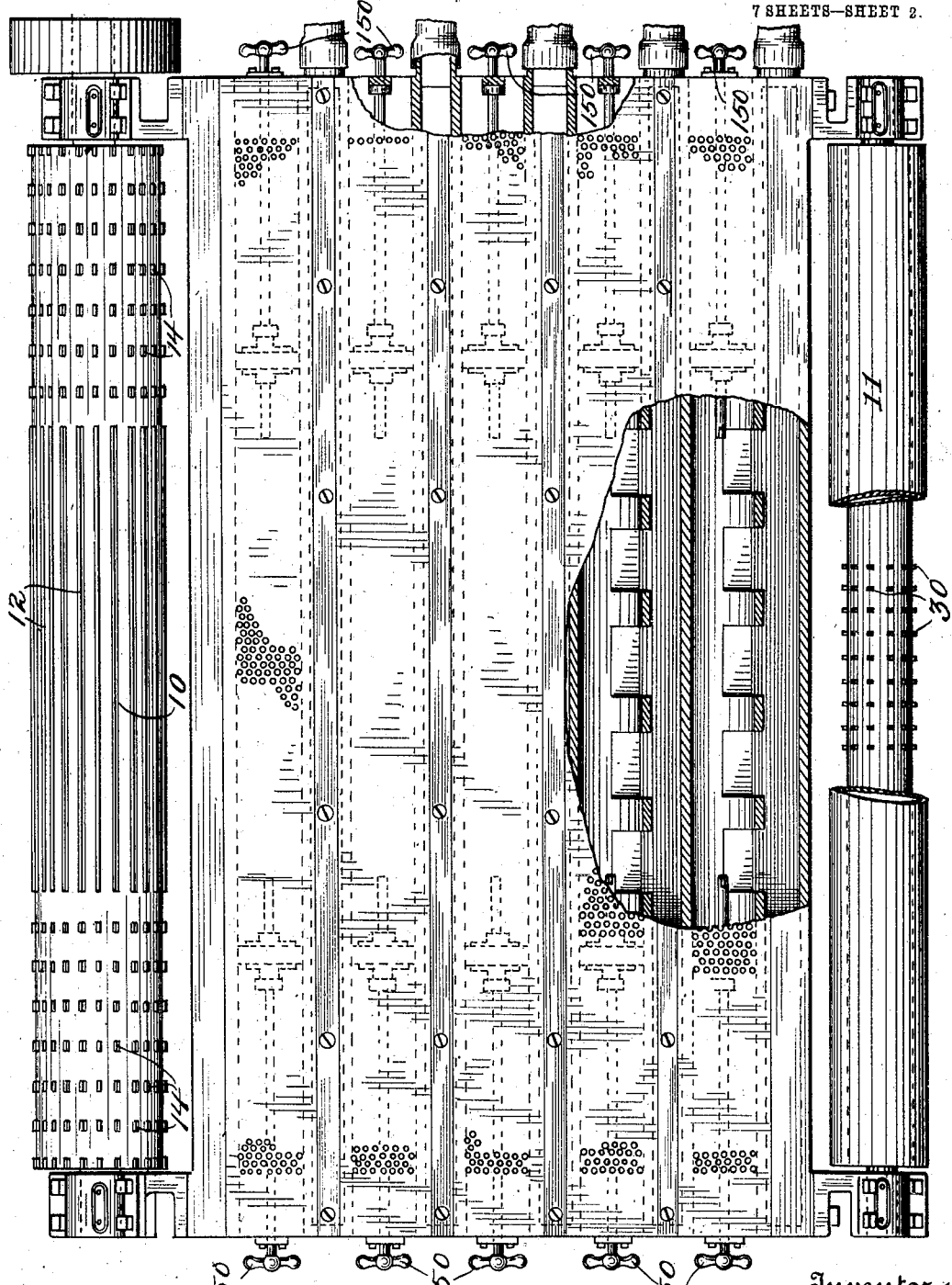
Figure 4:
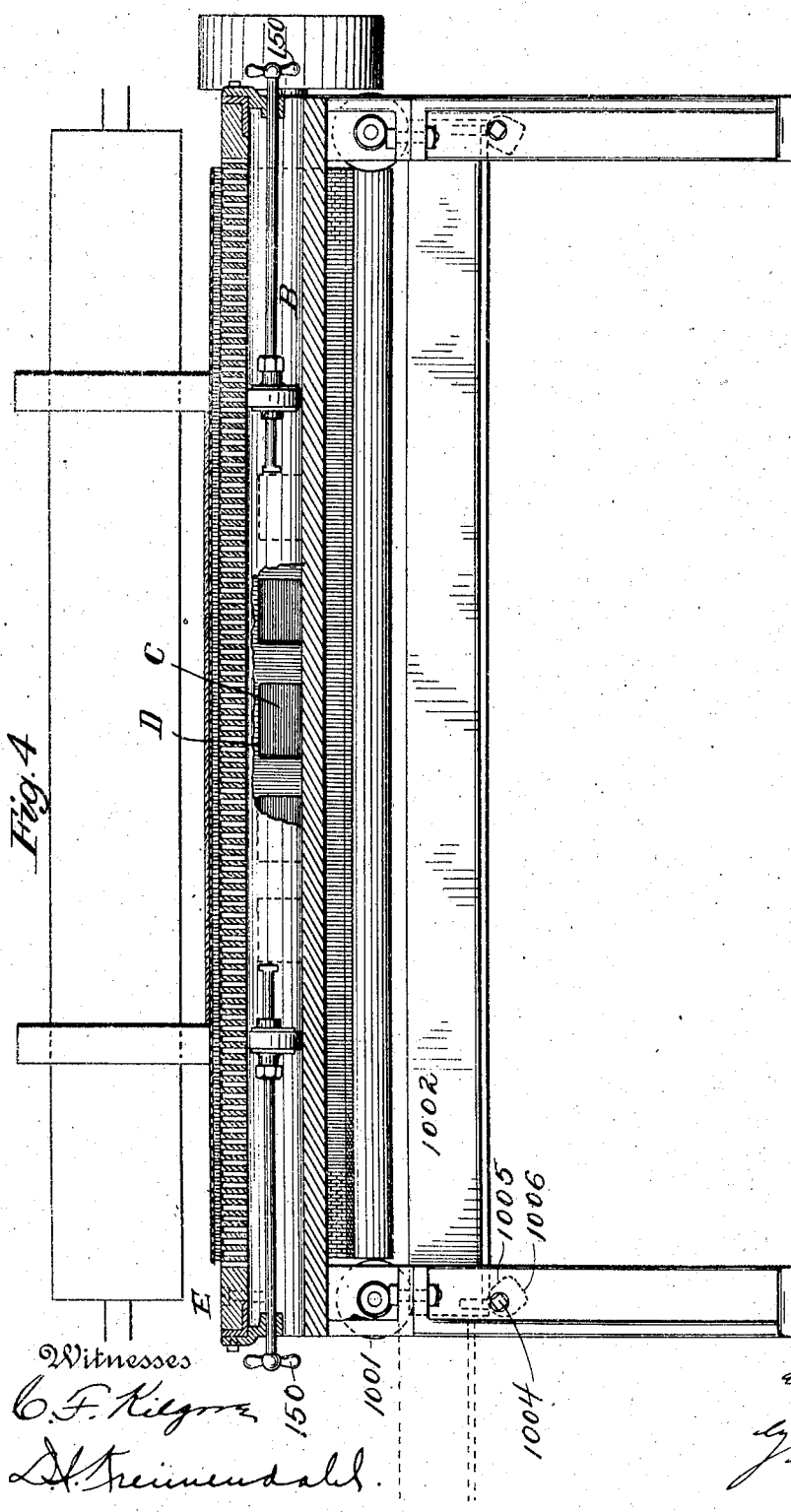
Figure 5:
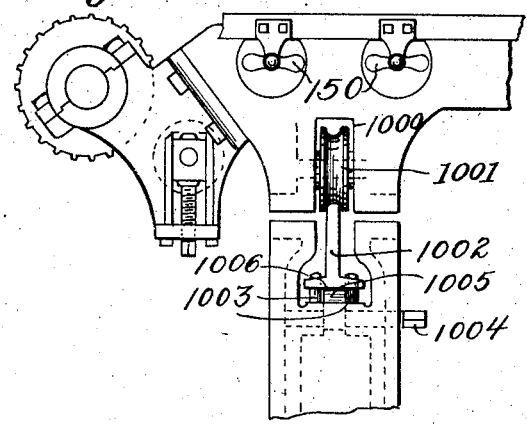
Figure 6:
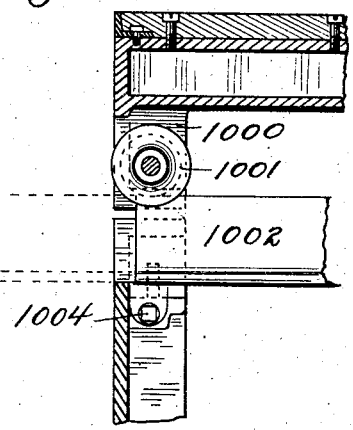
Figure 7:
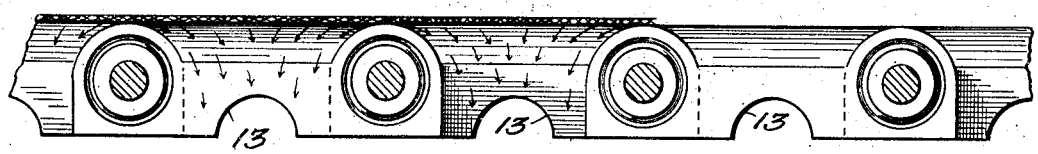
Figure 8:
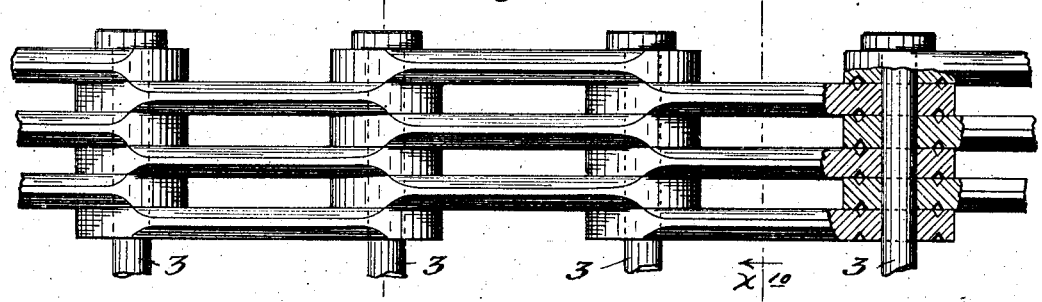
Figure 9:
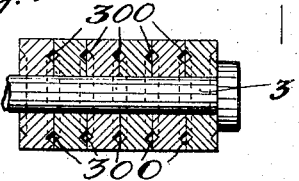
Figure 10:
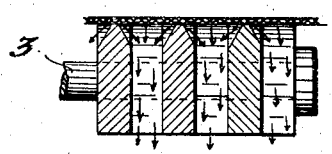
Figure 14:
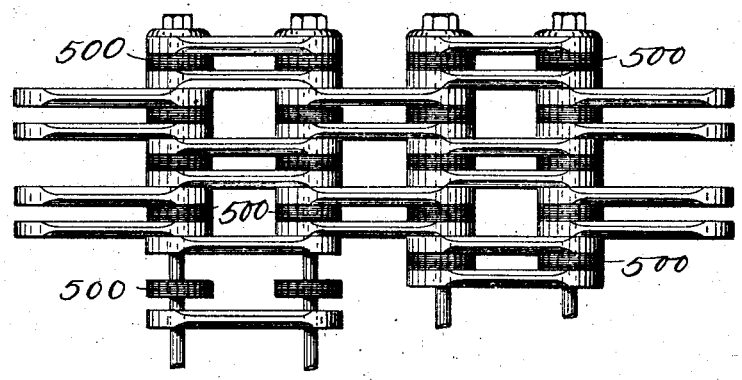
Figure 15:
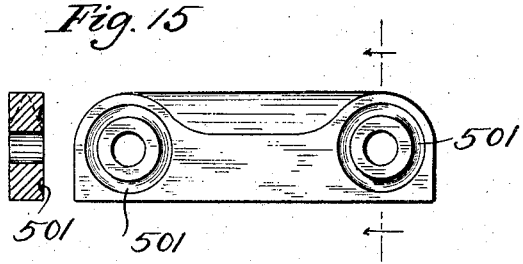
Figure 16:
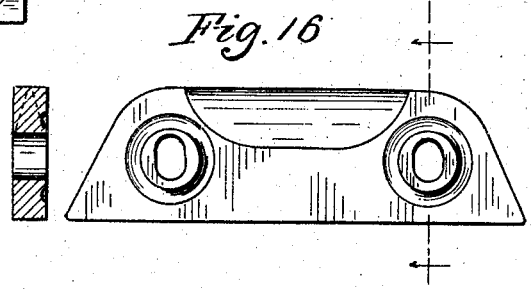
Figure 17:
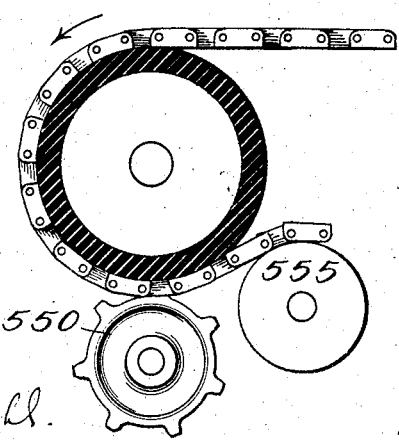
Figure 18:
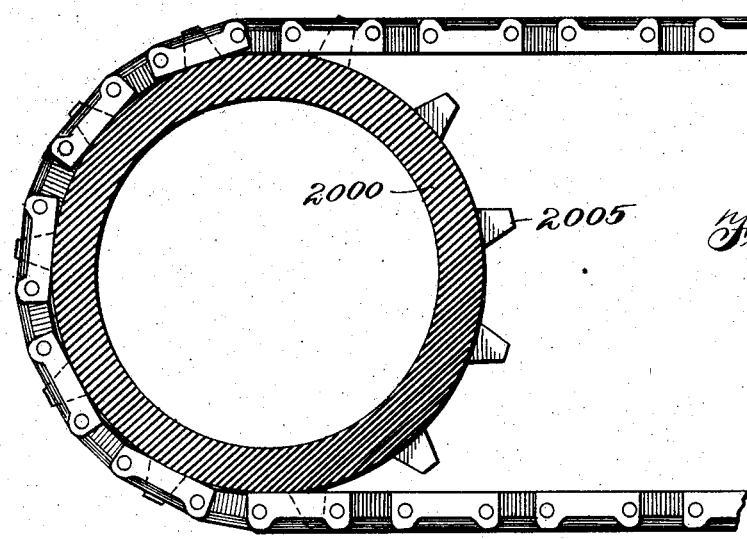
Figure 19:
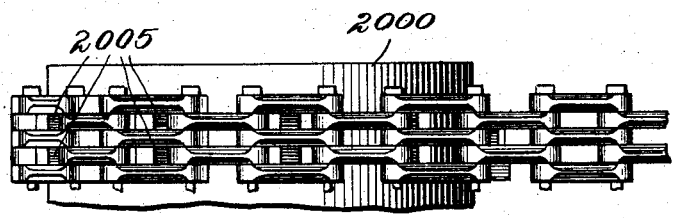
Figure 20:
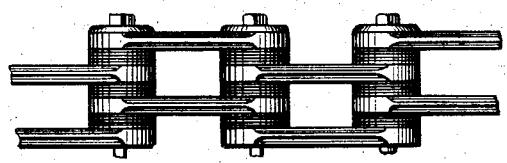
Figure 21:
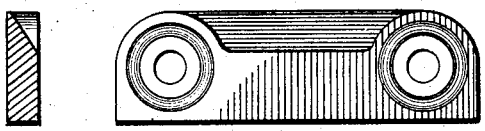

Figure 1 is a side view of a machine embodying our invention. Fig. 2 is a detail side sectional view of the upper part of the machine, showing the suction apparatus. Fig. 3 is a general plan view of the top of the machine with parts broken away to show the construction. Fig. 4 is a cross-sectional view taken through one of the suction-troughs. Figs. 5 and 6 are detail views showing the method of removing the top from the pedestals. Fig. 7 is a side sectional view in detail, on enlarged scale, of a piece of the chain belt. Fig. 8 is a top view of the same with parts broken away. Fig. 9 is a sectional view of the chain on the line $x^9\ x^9$ of Fig. 8. Fig. 10 is a sectional view on the line $x^{10}\ x^{10}$ of Fig. 8. Fig. 11 is a bottom view of the chain. Fig. 12 is a detail cross-sectional view through a suction-trough and showing a section of the chain on the line $x^{12}\ x^{12}$ of Fig. 11. Fig. 13 is a detail view of the adjustable stop. Fig. 14 is a view of a modified form of the chain. Figs. 15 and 16 are views of modified forms of chain-links. Fig. 17 is a view of a modified form of drive. Figs. 18 and 19 are views of another form of a belt-drive. Fig. 20 is a further modification of a chain construction similar to Fig. 14. Fig. 21 is a further modified form of a chain-link.

The general uses of a suction apparatus in connection with pulp and paper machinery are understood by those who are skilled in this art. In machines where the pulp is flooded onto a wire screen this screen is passed over some sort of a suction apparatus in order to remove as much moisture as possible from the pulp.

The main top of the machine, which is called herein the "suction-box," is preferably cast in a single piece A. Troughs B and chambers C are cored out, the troughs B being lined with Babbitt or similar metal to give a smooth and finished surface, thus obviating the necessity for any machine-work for finishing the interior of the troughs and greatly reducing the expense of construction. As shown in Figs. 1 and 3, there are five of these troughs B extending across the machine, and adjacent to the troughs are suction-chambers C. Preferably there is one suction-chamber for each trough, and they are in communication with one another through the ports D. As clearly indicated in Figs. 2, 3, 4, and 12, each trough is provided with a suction-stop at each end operated by handles 150, which are intended to be expanded against the walls of the troughs B, forming ends for the troughs and limiting the size of the suction-compartments of the troughs. Each suction-chamber is in communication with a suction or vacuum pump or other device which is designed to create a vacuum in the chambers and draw the water from the pump through the troughs B into the chambers C.

On top of the suction-box is located a top E, which forms the top of the troughs and which is perforated over the troughs. This top is held in place by any suitable means, such as the wedge-shaped pieces F, bolted onto the suction-box casting by the bolts G. This forms an inexpensive top to the suction-box which will wear evenly and always be a perfect fit and which can be readily renewed with very little expense. From end to end of the machine this top is crowned as shown in Fig. 1—that is to say, it is slightly higher in the center than it is at the ends, and the center is a trifle higher than the point at which the chain leaves the roll 11 and runs onto the roll 10. The chain is drawn across the box from the forward end of the machine, thus drawing it close down onto the crowned top and insuring close contact and preventing breaking of the suction by drawing in air from the sides under the chain-links. Brackets are bolted to each end of the suction-box casting, and in these brackets are journaled the rolls 10 11, about which the chain-belt runs.

The suction-box is supported on pedestals 1 2; but the whole top of the machine, including the suction device, the rolls, and the chain belt, may be removed from the pedestals in the following manner: Journaled in recesses 1000 are grooved wheels 1001. Removably located in recesses in the pedestals are T-shaped rails 1002, which are free to move up and down on the pins 1003. Underneath these rails there are journaled in the pedestals shafts 1004, on which are cams 1005, which at their highest points are flattened off, as at 1006. Normally—that is, when the top of the machine is in place on the pedestals and the machine in operation—the grooved wheels are out of contact with the T-shaped rails. When it is desired to remove the top of the machine from the pedestals for any purpose, the rails are inserted, the shaft is turned, and the cams acting on the rails raise them into contact with the grooved wheels and raise the top of the machine clear of the pedestals. At this point the rail is resting on the flat part of the cams. Additional rails being placed outside of the machine and with their ends butting against the T-shaped rails in the machine, the top can then be run out and away from the paper-machine.

The screens are of a delicate and extremely expensive construction and are subjected to very hard usage in passing across the suction apparatus. In connection with work in this art, and particularly in developing more efficient and practical forms of suction apparatus, it has been discovered that the wear on the wires can be greatly reduced by interposing between the wire and the suction apparatus a belt or carrier of some sort which shall move across the suction apparatus at substantially the same speed as the wire and take the wear which formerly has been borne by the wire. In some earlier patents, notably No. 700,554, of May 20, 1902, the functions and objects of a belt of this kind and the advantages of its use are described in detail. Inasmuch as this "carrier-belt," as it is sometimes called, is subjected to hard usage and is designed to save the expense of a forming-screen, it must be constructed as cheaply as possible and still have the requisite wear-resisting qualities. Thus the surface of the belt which is in contact with the suction apparatus must be as inexpensive as possible, and the points of contact between it and the screen must be as small as possible in order to permit the force of the suction to act over the whole surface of the screen to thoroughly dry the pulp or paper.

The chain belt herein shown and described differs considerably from belts which have been previously constructed and has certain novel features, which will now be described. This belt is, in effect, a broad chain made up of short links which are arranged side by side across the machine, as shown in Figs. 4, 11, and 12, these links being suitably held together by the pins 3. The belt is endless and passes about rolls 10 and 11 at each end of the machine. The bottom of each link is flat, and the tops are chamfered or beveled off, as clearly indicated in Figs. 8 and 10, leaving a very narrow surface in contact with the screen. The broad ends of the links are rounded off, as shown in Figs. 7 and 8, so that they will not be in contact with the screen and cut off any considerable portion of it from the suction action. As this belt travels across the suction-box it is essential that there shall be no avenue for the passage of air into the suction-compartments except through the pulp, and for this reason we have adopted various devices for sealing up all joints where there is a possibility that the suction might be broken. For instance, the faces of the links which contact with one another at the pivotal points are grooved, as at 300, which grooves, becoming filled with water, constitute an effective water seal.

The chain belt is dragged across the top of the suction apparatus by the roll 10, thus drawing the chain closely down upon the crowning top of the suction apparatus. The central part of this roll 10 has ridges or teeth 12, which engage with notches 13, formed in the bottom of the links. These teeth or ridges should be no longer than the narrowest sheet of pulp or paper which it is desired to form on the machine, and necessarily all of the links running over these ridges must be notched. At each side of these long teeth are a series of rows of comparatively shorter teeth, the width of the face of each tooth being a trifle greater than the width of two links and one space between them. These rows of teeth are indicated at 14 in Fig. 3. With reference to Fig. 11, it will be seen that the links which pass over these rows of smaller teeth are also notched, as at 15 16, as they must be, and it will be seen, further, that the bottoms of the links between the rows of notched links are solid and that as they pass over the top of the suction apparatus they have a continuous bearing from end to end. Thus is the chain driven throughout its entire width, relieving the pivot-pins 2 to a considerable degree and maintaining the belt in alinement. In order that the belt will not run out of alinement as it passes about roll 11, there are provided small pins 30, seated in a roll journaled under the roll 11, which project into the spaces between the links and prevent the belt from moving from side to side.

The construction of the belt being fully understood, the manner of its coöperation with the rest of the machine will be clearly understood, particularly with reference to Fig. 12. At B will be seen one of the suction-troughs and at D the port leading into a suction-chamber. The perforated top for the suction-box is shown at E. The chain is seen at X, the wire at Y, and the deckle at Z. This figure is a vertical cross-sectional view. The width of the sheet to be formed is determined by the position of the deckles, there being another corresponding to the one at Z on the other side of the sheet. When the deckles are in position, the suction-stops 100 are adjusted so that their inner edges will register with the inner edges of the deckles. It will be seen that the suction-stops in connection with the deckles determine the width of the surface which is subjected to the suction action, so that by this construction there is no chance for the suction action to be interfered with by leakage from the outside. The suction-stop 100, above referred to, is made up of two plates 101 102 with their oppositely-disposed faces beveled, the gasket 103, of rubber or like material, being positioned between these plates. Through the plate 102 extends the threaded sleeve 104, which has a collar engaging the plate 102 and is threaded into plate 101. This sleeve 104 has a locking-recess 105, with which the T-shaped end of the rod 106 may be engaged or disengaged, drawing the plates 101 and 102 together or throwing them apart. On the outer side of the plate 101 is a hub, which is recessed and has a collar threaded onto it. This collar is recessed oppositely to the recess in the end of the hub, and this space is intended to be filled with a packing material of some kind to prevent leakage of air along the rod 106. This construction and the use of the stuffing-box obviates the necessity of providing ends for the suction-troughs. The width of the face of the rubber gasket is greater than the width of three teeth, the two spaces between them, and the two spaces outside, so that under all conditions the stops in connection with the deckles form an air-tight seal, preventing leakage through the notches in the links, which engage with the narrow teeth 14.

From an examination of Figs. 1 and 2 it will be seen that the cross-section of the suction-troughs is cylindrical and that the tops are flattened off, being formed by the perforated wooden top. The suction-stops are shaped to fit into the troughs, and the flat top of the stop coöperating with the bottom of the top plate acts to prevent the stop from turning while the rubber gasket is being expanded.

In Figs. 14, 15, 16, and 17 is illustrated a modified form of a chain belt. In Fig. 14 there are shown rubber washers 500 between the links. These rubber washers act as seals for the joints, and they also permit of a certain amount of adjustment in the width of the chain. Fig. 15 shows in detail a link grooved, as at 501, to form a water seal. Fig. 16 shows a link with an elongated base-line providing an increased amount of wearing-surface, which is greatly to be desired. Fig. 17 shows a method of driving by means of the sprocket-wheel 550, which engages with the links of the chain, 555 being an idler-roll to take up the slack. By the use of this construction it is not necessary to notch the bottoms of any of the links, and it is advantageous in assuring a perfect contact of the belt with the top of the suction apparatus throughout its width.

In Fig. 18 there is illustrated a modification of the driving mechanism for the belt, the modification consisting in providing sprockets 2000 with teeth 2005, which fit in between the links making up the belt. Instead of having a number of sprockets a roll with series of sprocket-teeth may be used.

In the modified form of chain belt shown in Fig. 20 a washer, preferably of rubber or material of like characteristics, separates each link from its adjacent link. This provides an air-tight joint between the links and allows to a certain extent for the adjustment of the belt.

Fig. 21 is a detail of a chain-link chamfered toward the top on one side only.

We have described our invention in what now appears to be its preferred form. We are aware that the details of the construction are susceptible of changes and alterations to meet requirements in special cases, and we wish to include herein and in the claims any and all such modifications.

We claim as our invention—

1. In a machine of the class specified the combination with the suction-box, of a perforated top secured thereto and crowned from end to end of the machine.

2. In a machine of the class specified the combination with the suction-box, of a top therefor, suitably perforated and secured in place by stringers.

3. In a machine of the class specified in combination the suction-box comprising a series of troughs, and suction-chambers in communication with said troughs, substantially as described and for the purposes set forth.

4. In a machine of the class specified the suction-box comprising a series of open-ended suction-troughs, suction-chambers in communication therewith and a suitable top for said box, said top being perforated over the suction-troughs, substantially as described and for the purposes set forth.

5. In a machine of the class specified the suction-box comprising open-ended troughs, suction-chambers in communication therewith, and adjustable stops adapted to close said troughs at different points between their ends.

6. In a machine of the class specified the combination with the suction-box comprising a series of suction-troughs of irregular cross-section, and communicating suction-chambers, of adjustable stops adapted in shape to the shape of the troughs, substantially as described.

7. In a machine of the class specified the combination with the pedestals or corresponding parts of the machine, and rails supported thereby, of a top located upon said pedestals, and grooved wheels journaled in the top and adapted to coöperate with said rails to permit of removal of the top from the pedestals.

8. In a machine of the class specified the combination with the pedestals or corresponding parts of the machine, and rails supported thereby, of the top supported on said pedestals, wheels journaled in the top and adapted to move on the rails, said wheels being normally out of engagement with said rails.

9. In a machine of the class specified the combination with the pedestals or corresponding parts of the machine, and rails supported thereby, of the top supported on said pedestals, wheels journaled in the top and adapted to move on the rails, said wheels being normally out of engagement with said rails, and means for bringing the wheels and rails into contact with one another.

10. In a machine of the class specified the combination with the pedestals, and rails supported thereby, of the top supported on said pedestals, wheels journaled in the top and adapted to move on the rails, said wheels being normally out of engagement with said rails, and means for raising said rails until they contact with said wheels and raise the top clear of the pedestals.

11. In a machine of the class specified the combination with the suction-box and open-ended suction-troughs, of adjustable stops adapted to close said troughs at varying points between their ends, a rod for operating said stops and adapted for movement therethrough, and an air-tight packing between the stop and the rod.

12. In a machine of the class specified the combination with the suction-box and the open-ended suction-troughs, of adjustable stops adapted to close said troughs at varying points between their ends, a rod for operating said stops and adapted for movement therethrough, and a stuffing-box carried by the stop and surrounding said rod, substantially as described.

13. A carrier-belt for paper-making and like machines made up of a series of links arranged side by side in rows which are pivotally secured together; notches cut in the under faces of some of the links; said notched links being arranged in groups which are separated by groups of unnotched links.

14. A carrier-belt for paper-making and like machinery comprising a series of metallic links suitably secured together with washers of a flexible material between adjacent links.

15. A carrier-belt for paper-making and like machines comprising links arranged side by side in rows which are pivotally secured together; notches cut in the under surfaces of some of the links, two or more of the notched links alternating with two or more of the plain links.

16. In a pulp-treating or paper-making machine the combination with a suction-operated drying or moisture-extracting device, and a traveling felt carrying the material to be acted upon, of a carrier-belt interposed therebetween, said belt comprising a series of rows of links whose ends overlap, and means for securing said overlapping ends together.

17. In a pulp-treating or paper-making machine the combination with a suction-operated drying or moisture-extracting device, and a traveling felt carrying the material to be acted upon, of a carrier-belt interposed therebetween, said belt comprising a series of links suitably secured together, the contacting faces of said links having oppositely-disposed annular grooves, substantially as described and for the purposes set forth.

18. In a pulp-treating or paper-making machine the combination with a suction-operated drying or moisture-extracting device, and a traveling felt carrying the material to be acted upon, of a carrier-belt interposed therebetween, said belt comprising a series of rows of links whose ends overlap and form air-tight joints, and means for securing said overlapping ends together.

19. In a pulp-treating or paper-making machine the combination with a suction-operated drying or moisture-extracting device, and a traveling felt carrying the material to be acted upon, of a carrier-belt interposed therebetween, said belt comprising a series of links suitably secured together, the upper faces of said links which contact with said felt being reduced in thickness, as and for the purposes specified.

20. In a pulp-treating or paper-making machine the combination with the suction-operated moisture-extracting device and a traveling felt carrying the material to be acted upon, of a carrier-belt interposed therebetween and adapted to move lengthwise of the machine with the said felt, said belt comprising a series of links suitably secured together and having their under faces notched, and a roll located at the end of said suction-box frame toward which the belt moves, said roll being provided with ribs adapted to coact with the notches in the links.

21. In a pulp-treating or paper-making machine the combination with a suction-operated moisture-extracting device, a traveling felt, and a carrier-belt interposed therebetween, said belt being made up of a series of links suitably secured together, of a driving-roll for said belt at one end of the suction-box frame, and an alining roll at the opposite end thereof located in operative relation to said belt.

22. In a pulp-treating or paper-making machine adapted to extract moisture from the pulp comprising a suction apparatus and a traveling felt, the combination with said apparatus, of the carrier-belt moving thereover and supporting said felt, said belt being made up of a series of rows of links whose ends overlap and are suitably secured together, and the deckle-straps, all coöperating as and for the purposes specified.

23. A carrier-belt for paper-making and like machines comprising links arranged side by side in rows which are pivotally secured together; notches cut in the under surfaces of some of the links, two or more of the notched links alternating with two or more of the plain links, and a roller for driving said carrier-belt having ribs which engage the notched links.

In testimony whereof we affix our signatures in presence of two witnesses.

HOWARD PARKER.
GEO. A. CUTTER.

Witnesses:
   B. A. PEASE,
   L. H. OTIS.